US011074664B1

(12) United States Patent
John et al.

(10) Patent No.: US 11,074,664 B1
(45) Date of Patent: Jul. 27, 2021

(54) USING UWB RADIO TO EXECUTE A PEDESTRIAN-VEHICLE RENDEZVOUS

(71) Applicant: Ford Global Technologies, LLC, Dearborn, MI (US)

(72) Inventors: Jerry John, Sunnyvale, CA (US); Yun Ho Lee, Pleasanton, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/752,151

(22) Filed: Jan. 24, 2020

(51) Int. Cl.
*G06Q 50/30* (2012.01)
*G01S 19/46* (2010.01)
*H04B 1/3822* (2015.01)

(52) U.S. Cl.
CPC .............. *G06Q 50/30* (2013.01); *G01S 19/46* (2013.01); *H04B 1/3822* (2013.01)

(58) Field of Classification Search
CPC ...... H04B 1/69; H04B 1/707; H04B 1/71637; H04B 1/7183; H04B 1/719
USPC ......................................................... 375/130
See application file for complete search history.

(56) References Cited

U.S. PATENT DOCUMENTS

| 10,859,670 | B2* | 12/2020 | Chu | G08G 1/123 |
| 2015/0279216 | A1* | 10/2015 | Ghanma | H04W 4/026 |
| | | | | 705/7.15 |
| 2016/0176382 | A1* | 6/2016 | Siswick | G01S 5/0289 |
| | | | | 701/2 |
| 2017/0227371 | A1* | 8/2017 | O'Mahony | G08G 1/202 |
| 2018/0053423 | A1* | 2/2018 | DaCosta | G06Q 30/0633 |
| 2019/0268743 | A1* | 8/2019 | Cho | G08G 1/096791 |

* cited by examiner

*Primary Examiner* — Shuwang Liu
*Assistant Examiner* — Gina M McKie
(74) *Attorney, Agent, or Firm* — Michael Spenner; Eversheds Sutherland (US) LLP

(57) ABSTRACT

The disclosure pertains to using ultra-wideband (UWB) radio communications to execute a pedestrian-vehicle rendezvous. In one example operation, a personal device such as a smartphone, is used to identify a location of a vehicle with a first level of accuracy. For example, the smartphone may be used by a pedestrian to obtain GPS location coordinates of a ride-hail vehicle summoned by the pedestrian. The vehicle may be located relatively far from the pedestrian. The smartphone may be configured to automatically establish a UWB radio link with a UWB transponder in the vehicle and/or a smartphone carried by a driver of the ride-hail vehicle, when the vehicle is within range to establish UWB communications. The UWB radio link may be used to execute one or more of various procedures to locate the vehicle with a second level of accuracy that is higher than the first level of accuracy.

13 Claims, 6 Drawing Sheets

USING UWB RADIO TO EXECUTE A PEDESTRIAN-VEHICLE RENDEZVOUS

FIELD OF THE DISCLOSURE

This disclosure generally relates to location identification, and more particularly relates to the use of ultra-wideband (UWB) radio for facilitating a pedestrian-vehicle rendezvous.

BACKGROUND

In days past, the process of picking up a person in a vehicle involved the use of landmarks. For example, the person may describe a pickup spot as follows: "near Bob's sandwich place at the corner of $1^{st}$ Main and $5^{th}$ Street," or "near the north entrance to the mall." The driver of the vehicle would then look for the person as the vehicle approached the pickup spot. Such a process works reasonably well when the driver is familiar with the area around the pickup spot, but may not work so well when the driver is in an unfamiliar area, or when the pickup spot is in a downtown area with heavy traffic and/or parking restrictions.

The advent of global positioning system (GPS) provided significant improvement in terms of location information and navigation guidance. However, GPS signal coverage can be lost in certain areas, such as in a downtown area having tall buildings. Driving in heavy traffic in a downtown area can be stressful in the absence of GPS signals, particularly when looking away from traffic to search for a person standing at a pickup spot.

GPS signals can also be lost inside structures such as a covered parking deck or an underground garage, thereby making it difficult for a driver of the vehicle to locate a person who is waiting for the vehicle and/or for the person to locate the vehicle that is moving around inside the covered parking deck or underground garage searching for the person.

It is therefore desirable to provide better solutions for performing a pedestrian-vehicle rendezvous operation.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
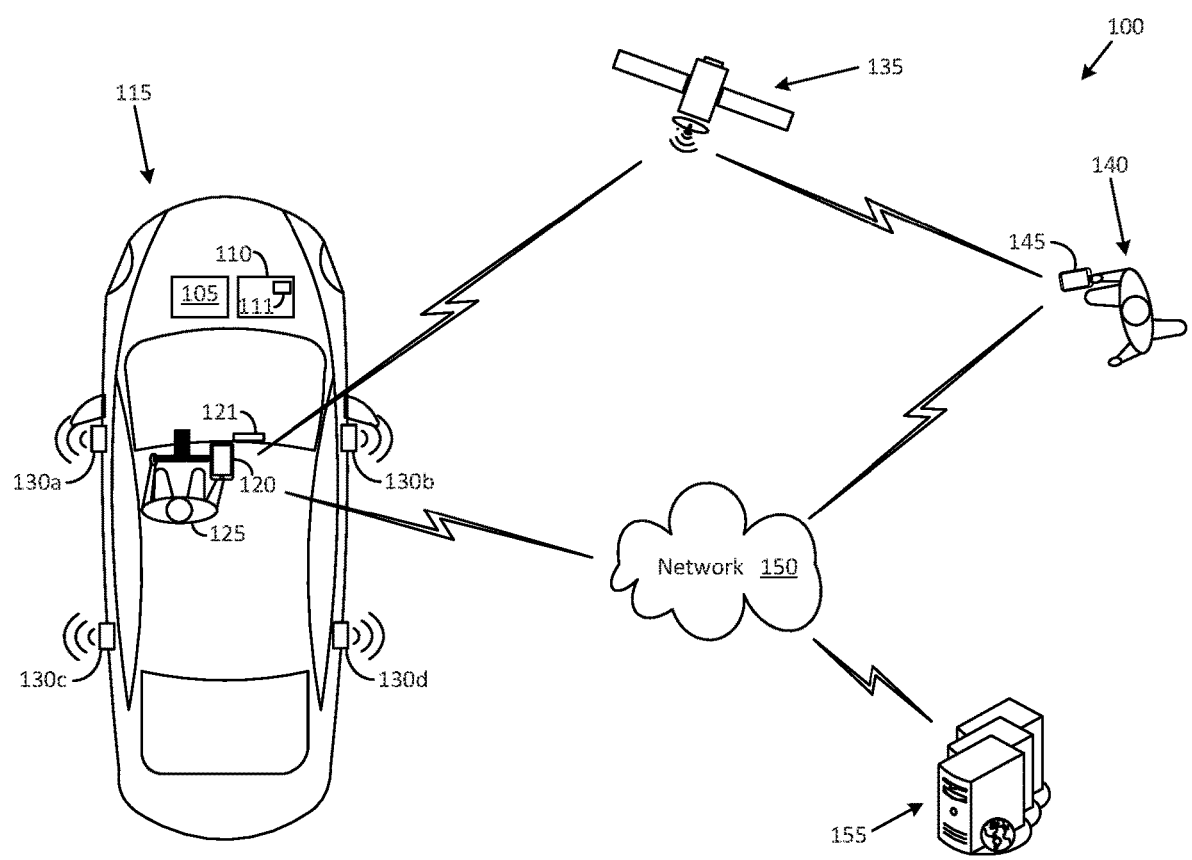
FIG. 1 illustrates a first example scenario associated with a pedestrian-vehicle rendezvous system in accordance with the disclosure.

In terms of a general overview, certain embodiments described in this disclosure are directed to using ultra-wideband (UWB) radio communications to execute a pedestrian-vehicle rendezvous. In an example method, a personal device, such as a smartphone, is used to identify a location of a vehicle with a first level of accuracy. For example, the smartphone may be used by a pedestrian to obtain GPS location coordinates of a ride-hail vehicle summoned by the pedestrian who can be a customer of the ride-hail vehicle. The vehicle may be located relatively far from the pedestrian (a mile away, for example) and the GPS coordinates offer a first level of accuracy. The smartphone may be configured to automatically establish a UWB radio link with a UWB transponder in the vehicle and/or a smartphone carried by a driver of the ride-hail vehicle when the vehicle is within range to establish UWB communications. The UWB radio link may then be used to execute one or more of various procedures to locate the vehicle with a second level of accuracy that is higher than the first level of accuracy.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular component such as a first processor in a first computer may be performed by another component such as a second processor in another computer. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and terms are used herein solely for convenience and such words and terms should be interpreted as referring to various objects and actions that are generally understood in various forms and equivalencies by persons of ordinary skill in the art. More particularly, the phrase "personal device" as used herein can refer to any type of device carried by a person. A few examples of a personal device include a smartphone, a tablet computer, a phablet (phone plus tablet), a wearable device, and a laptop computer. It should also be understood that the word "example" as used herein is intended to be non-exclusionary and non-limiting in nature.

FIG. 1 illustrates a first example scenario associated with a pedestrian-vehicle rendezvous system 100 in accordance with the disclosure. The pedestrian-vehicle rendezvous system 100 can include a personal device 145 carried by a pedestrian 140 who desires to rendezvous with a vehicle 115. The vehicle 115 can be any of various types of vehicles such as, for example, a personal vehicle driven by a friend, a corporate vehicle driven by a company employee, a taxi driven by a taxi driver, or a ride-hail vehicle driven be a person employed by a ride-hail company such as Uber® of Lyft®. The various components provided in the vehicle 115 can include a vehicle computer 105, an auxiliary computer 110, an infotainment system 121, and UWB radio hardware such as UWB transceivers 130a through 130d.

The vehicle computer 105 may perform various functions such as controlling engine operations (fuel injection, speed control, emissions control, braking, etc.), managing climate controls (air conditioning, heating etc.), activating airbags, and issuing warnings (check engine light, bulb failure, low tire pressure, vehicle in blind spot, etc.). The auxiliary computer 110 can include elements such as, for example, a UWB transponder 111, for executing various operations in accordance with the disclosure. The auxiliary computer 110 can also include circuitry for interacting with the infotainment system 121 for displaying images associated with a pedestrian-vehicle rendezvous in accordance with the disclosure. In some instances, images also can be displayed on the front or side windows using augmented reality systems. The images can include a map that shows a location of the personal device 145 of the pedestrian 140 relative to a location of the vehicle 115. In one example implementation, the auxiliary computer 110 is an independent unit and in another example implementation, some or all parts of the auxiliary computer 110 can be incorporated into the vehicle computer 105.

The UWB transceivers 130a through 130d can be mounted upon the vehicle 115 at various places. Though four UWB transceivers are shown in this example, in other cases, more than, or less than, four UWB transceivers may be employed. More particularly, in this example, a UWB transceiver 130a is mounted near a rear-view mirror on the driver side front door, a UWB transceiver 130b is mounted near a rear-view mirror on the passenger side front door, a UWB transceiver 130c is mounted on a driver side rear door, and a UWB transceiver 130d is mounted on a passenger side rear door. The UWB transceivers 130a through 130d may be communicatively coupled to the UWB transponder 111 provided in the auxiliary computer 110 (wirelessly and/or through a wired bus). The UWB transceivers 130a through 130d may also be configured to communicate over a UWB radio link with the personal device 145 carried by the pedestrian 140.

The personal device 145 carried by the pedestrian 140 can be a smartphone having a software application that is executed by the pedestrian 140 in order to perform pedestrian-vehicle rendezvous operations in accordance with the disclosure. The personal device 145 can receive GPS signals from a GPS satellite 135. The personal device 145 is communicatively coupled via a network 150 to various components such as a personal device 120 carried by a driver 125 of the vehicle 115, the vehicle computer 105, the auxiliary computer 110, the UWB transceivers 130a through 130d, and a server computer 155.

The network 150 may include any one or a combination of various networks such as a cellular network, a telephone network, a cable network, a wireless network, and/or private/public networks such as the Internet. For example, the network 150 can be a cellular network that supports cellular communications between the personal device 145 and the personal device 120. The network 150 may also include the Internet, which allows the personal device 145 to carry out communications and data transfers with the server computer 155, the vehicle computer 105, the auxiliary computer 110 and/or the personal device 120.

The personal device 120 carried by the driver 125 can be a smartphone having a software application that can be executed by the driver 125 for performing various actions in accordance with the disclosure. More particularly, the software application in the personal device 120 of the driver 125 can cooperate with the software application in the personal device 145 of the pedestrian 140 for performing pedestrian-vehicle rendezvous operations in accordance with the disclosure.

In another exemplary embodiment, the auxiliary computer 110 and/or the infotainment system 121, can include hardware and software configured for performing pedestrian-vehicle rendezvous operations in accordance with the disclosure. More particularly, the auxiliary computer 110 and/or the infotainment system 121 can cooperate with the personal device 120 of the driver 125 and/or the personal device 145 of the pedestrian 140 for performing pedestrian-vehicle rendezvous operations in accordance with the disclosure.

The server computer 155 may be accessed by the personal device 120 of the driver 125 and/or the personal device 145 of the pedestrian 140. In one example implementation, the server computer 155 may provide information about the vehicle 115 to the personal device 120 of the driver 125. For example, the server computer 155 may provide to the personal device 120, operating information of one or more of the UWB transceivers 130a through 130d (signal characteristics, signaling format, etc.), type, size, and dimensions of the vehicle 115, and a separation distance between the UWB transceiver 130b and the UWB transceiver 130d. The separation distance may be used by the personal device 145 to perform a triangulation procedure for locating the vehicle 115. The triangulation procedure is described below in more detail.

In the example scenario depicted in FIG. 1, the pedestrian 140 is located at a considerable distance from the vehicle 115 (a mile away, for example). The separation distance between the pedestrian 140 and the vehicle 115 is out of range for carrying out UWB radio communications. As is known, UWB radio technology involves the use of signals having very low energy levels for short-range, high-bandwidth communications over a large part of the radio spectrum. The technology enables pinpointing a precise location of objects such as smartphones, key fobs and tracking tags by measuring how long it takes super-short radio pulses to travel between devices equipped to operate using UWB. The accuracy provided by the use of UWB technology is significantly better than that provided by GPS technology.

The pedestrian 140 can obtain location information of the vehicle 115 via GPS signals received from the GPS satellite 135. Thus, for example, the pedestrian 140 may use the personal device 145 to recognize that the vehicle 115 is about a mile away at a location on a highway and can further use the GPS signals to track a movement of the vehicle 115 on the highway. The driver 125 of the vehicle 115 can similarly use signals received from the GPS satellite 135 to identify a location of the personal device 145, which automatically provides location information of the pedestrian 140. The location information obtained by the use of the GPS signals in civilian applications has a typical level of horizontal accuracy of a few meters (about 4 meters RMS) in accordance with performance data disclosed by the United States government.

The driver 125 of the vehicle 115 may be provided location information of the pedestrian 140 in other ways in place of, or in addition to, GPS signals. For example, in some cases, the pedestrian 140 may communicate with the driver 125 via his/her smartphone to inform the driver 125 of a current location of the pedestrian 140. The smartphone (personal device 145) may be used to talk with the driver 125 via the driver's smartphone (personal device 120), and/or to send a text message to the driver 125. For example, the pedestrian 140 may inform the driver (phone call, text, entry in a software application, etc.) that he/she is waiting for the vehicle 115 at a particular residence or at a particular street corner. The level of accuracy associated with providing location information to the driver 125 in this manner can be relatively low and may be largely dependent on the amount of specificity and clarity provided by the pedestrian 140.

Figure 2:
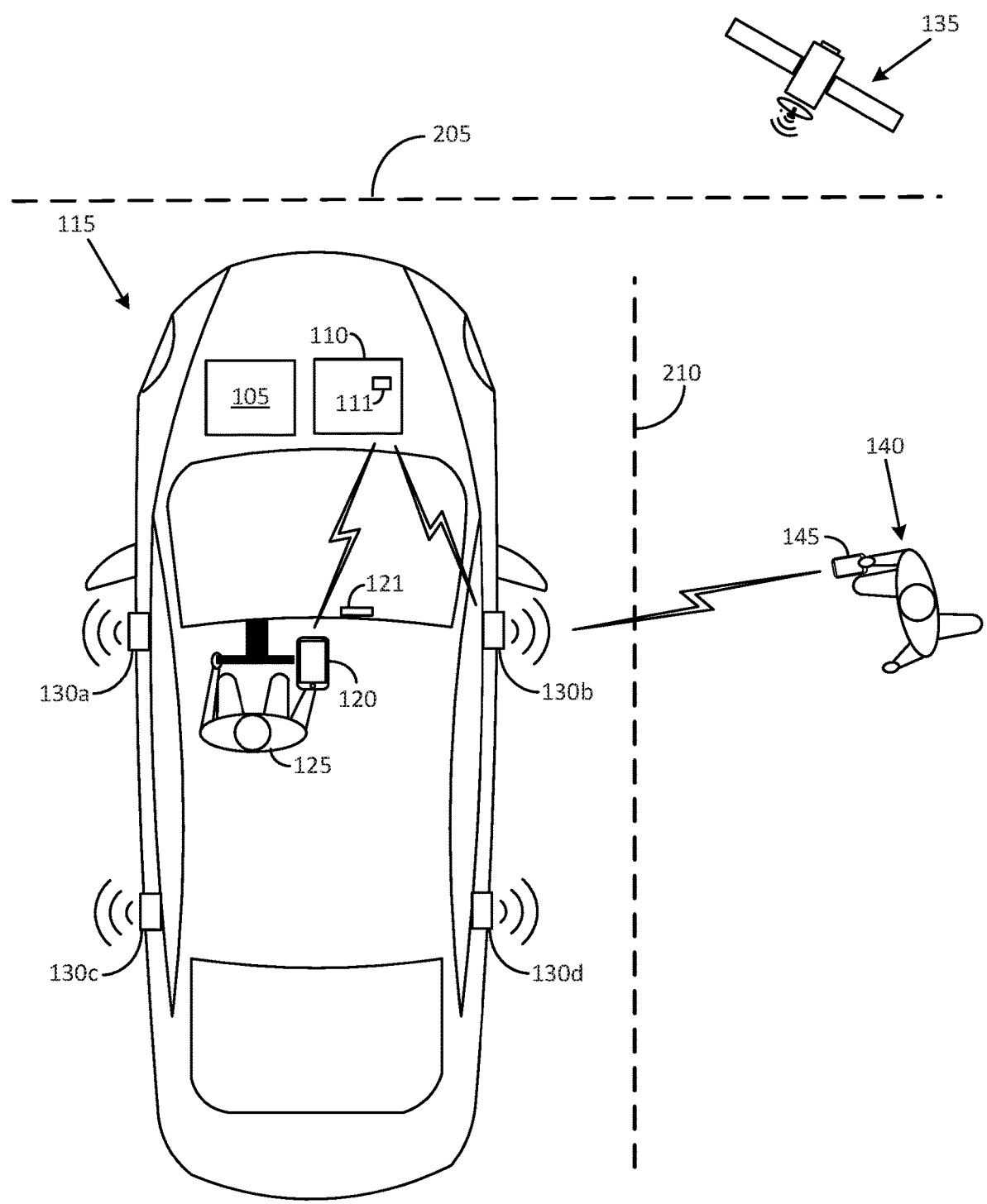
FIG. 2 illustrates a second example scenario associated with a pedestrian-vehicle rendezvous system in accordance with the disclosure.

FIG. 2 illustrates a second example scenario associated with the pedestrian-vehicle rendezvous system 100 in accordance with the disclosure. In this scenario, the vehicle 115 may have traveled to a spot that is closer to the pedestrian 140 than what is illustrated in FIG. 1. The separation distance between the vehicle 115 and the pedestrian 140 is now within a range of operation of the UWB transponder 111 (for example, 10 meters) and allows a UWB radio link to be established between the personal device 145 of the pedestrian 140 and the UWB transponder 111 in the auxiliary computer 110 (via the UWB transceiver 130*b* in this example).

The UWB radio link may be used to determine various parameters such as a current location of the pedestrian 140, a current location of the vehicle 115, and the separation distance between the vehicle 115 and the pedestrian 140, with a level of accuracy that is significantly better than that achievable by the use of GPS signals (or verbal information). As indicated above, the level of horizontal accuracy obtainable by the use of the GPS signals in civilian applications is of as order of several meters, whereas the level of accuracy obtainable by the use of UWB signals is of an order of several centimeters. The higher accuracy may be attributed to the use of short impulse UWB radio signals having steep edges that can be detected and processed for making high precision measurements.

In the illustrated scenario of FIG. 2, the vehicle 115 may be located in an underground garage or an underground parking deck such as at an airport. The ceiling 205 of the parking deck, which may be made of concrete with embedded iron bars, prevents GPS signals transmitted by the GPS satellite 135 from reaching the vehicle 115. Consequently, the driver 125 may be unable to obtain location information of the pedestrian 140, and vice-versa, when GPS signals are used for this purpose. Furthermore, certain obstructions, such as a wall 210 for example, may block cellular signal transmissions between the personal device 145 and the personal device 120. Consequently, the driver 125 may be unable to use the personal device 120 to talk with the pedestrian 140 and identify a location of the pedestrian 140. In some cases, cell phone coverage may be too poor to communicate via text messages as well.

However, UWB signals have the ability to pass through various obstructions such as the wall 210, thereby allowing UWB communications to be conducted between the driver 125 and the pedestrian 140. The UWB communications allow the driver 125 to use the personal device 120 and/or other components such as the auxiliary computer 110 or the infotainment system 121 to precisely determine a location of the pedestrian 140 in the underground parking deck, and vice-versa.

Furthermore, UWB signals do not interfere with cellular signals and GPS signals, thereby allowing UWB signals to co-exist with cellular and GPS signals. Consequently, in a two-step procedure in accordance with the disclosure, GPS signals (when available) may be used to identify an approximate location of the pedestrian 140 (and/or the vehicle 115), and UWB signals may then be used to identify a more precise location of the pedestrian 140 and/or the vehicle 115 based on the approximate location. Thus, for example, if the GPS signal procedure provides an indication that the pedestrian 140 is located at a spot on the passenger side of the vehicle 115, the UWB transceiver 130*b* and/or the UWB transceiver 130*d* may be used to determine a precise location of the pedestrian 140 at that spot. Alternatively, if the GPS signal procedure provides an indication that the pedestrian 140 is located at a spot on the driver side of the vehicle 115, the UWB transceiver 130*a* and/or the UWB transceiver 130*c* may be used to determine a precise location of the pedestrian 140 at that spot.

UWB communications (or other forms of communications such as Bluetooth®) may be used once the pedestrian 140 enters the vehicle 115, so as to perform other functions such as, for example, determining a seat position of the pedestrian 140 seated inside the vehicle 115 and/or to perform operations associated with a ride request initiated by the pedestrian 140 when the vehicle 115 is a ride-hail vehicle.

Figure 3:
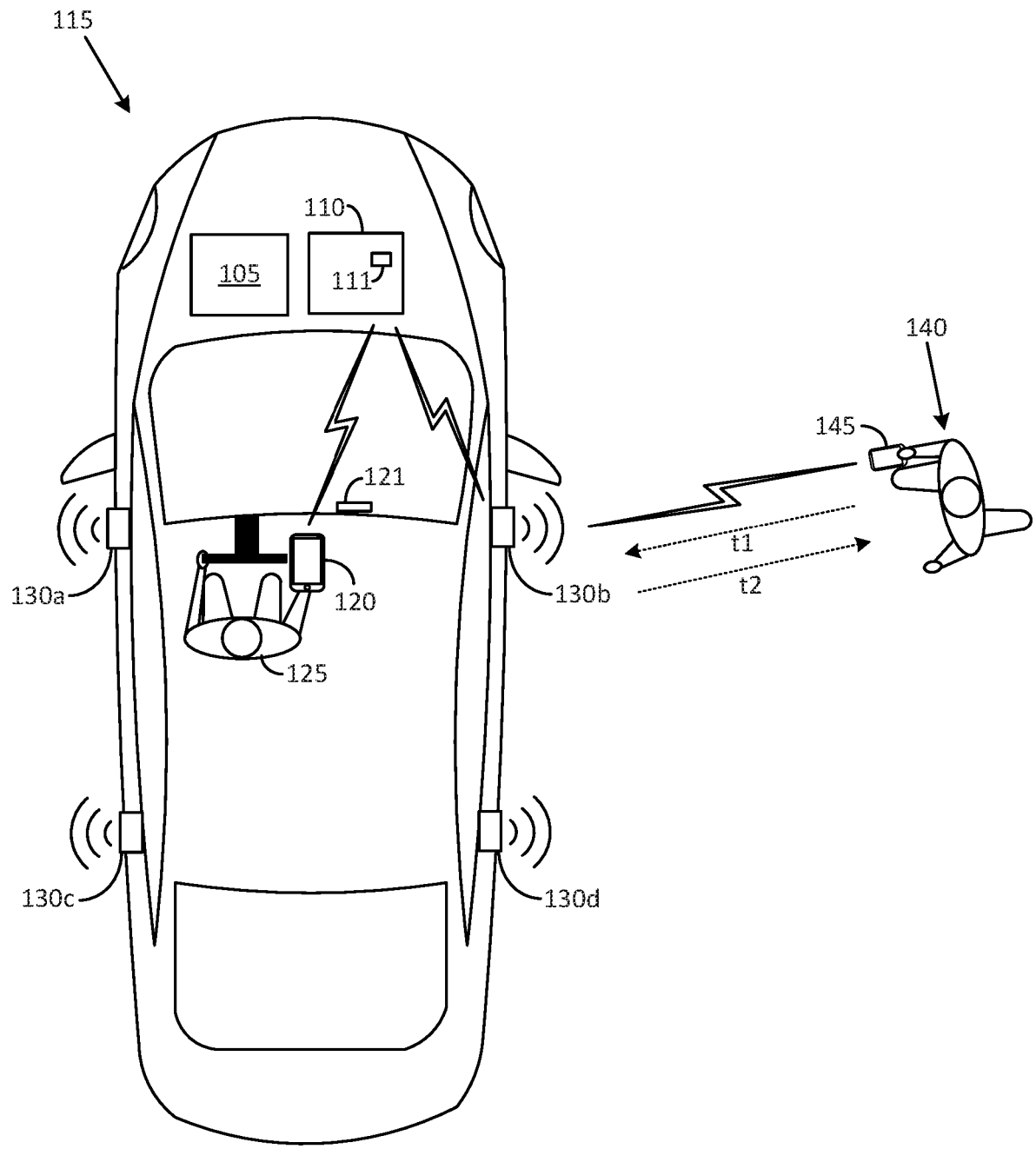
FIG. 3 illustrates a time-of-flight UWB procedure in accordance with an embodiment of the disclosure.

FIG. 3 illustrates a time-of-flight UWB procedure that can be used as a part of a pedestrian-vehicle rendezvous procedure in accordance with an embodiment of the disclosure. The time-of-flight UWB procedure may be used to determine a separation distance between the personal device 145 and the UWB transceiver 130*b* with a high level of accuracy. This measurement indirectly provides an indication of a separation distance between the pedestrian 140 and the vehicle 115. As a part of the procedure, a time (t1) taken by a UWB pulse to travel from the personal device 145 to the UWB transceiver 130*b* is combined with a time (t2) taken by the UWB pulse to travel back from the UWB transceiver 130*b* to the personal device 145, to obtain a total flight time of (t1+t2). The total flight time (t1+t2) is processed by a processor in the personal device 145 to determine the separation distance between the vehicle 115 and the personal device 145.

Conversely, a total flight time between the personal device 120 and the personal device 145 can be used to determine a separation distance between the personal device 120 and the personal device 145. The flight time measurement may be carried out by the auxiliary computer 110 in cooperation with the UWB transceiver 130*b* in this example.

In some cases, the driver 125 may not be present inside the vehicle 115, such as when the pedestrian 140 is the owner of the vehicle 115 or when the vehicle 115 is an autonomous vehicle. The vehicle 115 may be parked in a parking lot of a shopping center for example, and the pedestrian 140 may use UWB radio communications between the personal device 145 and the auxiliary computer 110 to identify the spot at which the vehicle 115 is parked.

Figure 4:
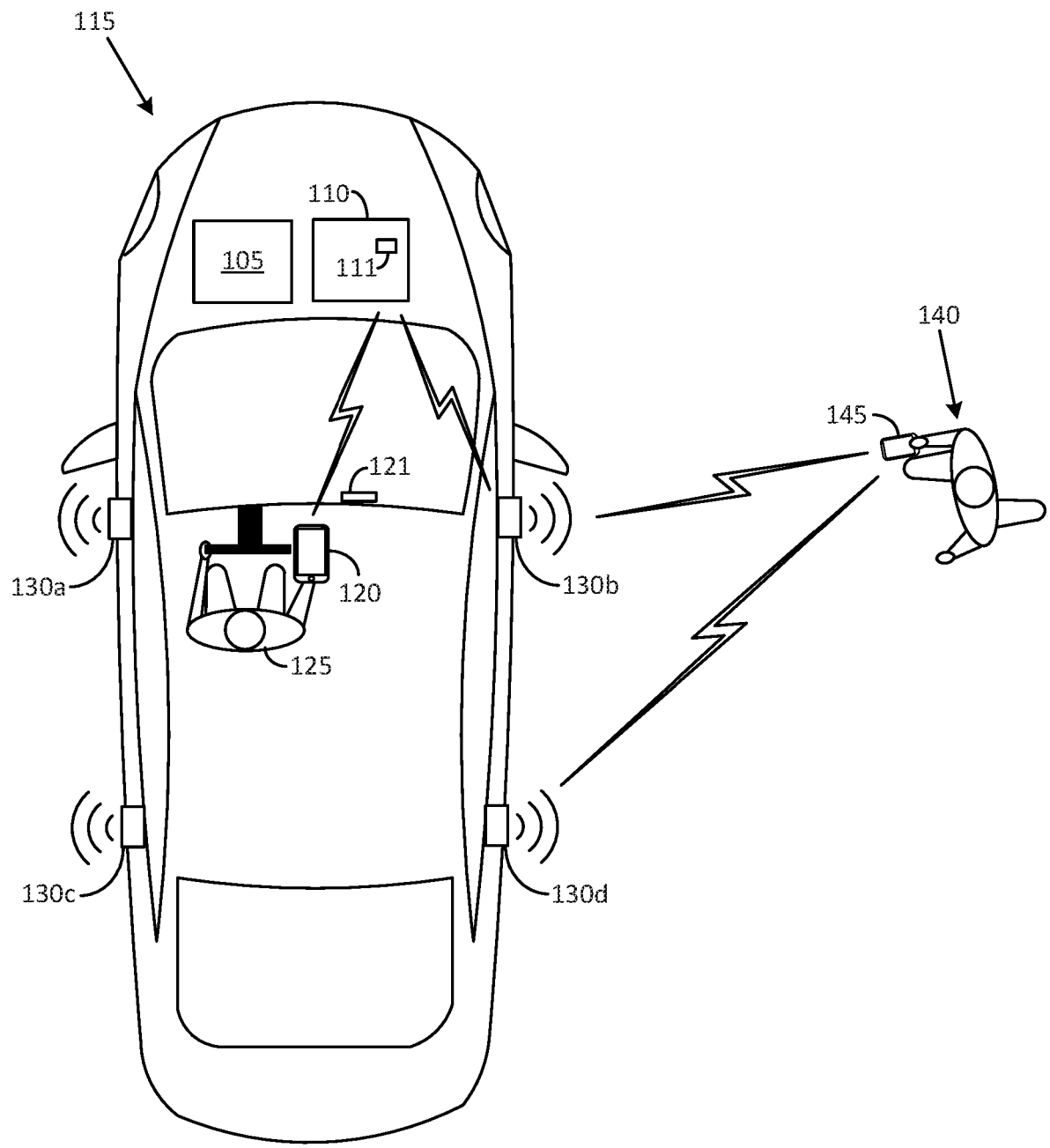
FIG. 4 illustrates a triangulation UWB procedure in accordance with an embodiment of the disclosure.

FIG. 4 illustrates a triangulation UWB procedure that can be used as a part of a pedestrian-vehicle rendezvous procedure in accordance with an embodiment of the disclosure. The triangulation procedure, which may be initiated by the personal device 145, employs UWB transmissions between the personal device 145 and a pair of UWB transceivers, such as the UWB transceiver 130b and the UWB transceiver 130d, to identify a position and/or an orientation of the vehicle 115 with respect to the personal device 145 (and indirectly with respect to the pedestrian 140). Spatial information of the UWB transceivers mounted on the vehicle 115 can be obtained from various sources, such as, for example, from the server computer 155, for carrying out the triangulation UWB procedure.

In the example scenario illustrated in FIG. 4, the triangulation procedure may provide an indication to the pedestrian 140 that he/she is located on the passenger side of the vehicle 115 and is closer to the passenger side front door. Separation distance information, which may also be obtained from the triangulation procedure, may allow the pedestrian 140 to estimate how long it will take him/her to reach the passenger side front door. The triangulation procedure may further provide an indication that the vehicle 115 is oriented in a north-south direction with the passenger side front door close to a curb. The location and/or orientation information may be used by the pedestrian 140 to move in a desired direction towards the vehicle 115.

In an alternative scenario, the pedestrian may be located on the driver side of the vehicle 115, which may be a ride-hail vehicle or an autonomous vehicle. The triangulation procedure may provide an indication to the pedestrian 140 that he/she is located on the driver side of the vehicle 115 and is closer to the driver side front door. Separation distance information that may also be obtained from the triangulation procedure may allow the pedestrian 140 to estimate how long it will take him/her to reach the driver side rear door of the vehicle 115. The triangulation procedure may further provide an indication that the vehicle 115 is oriented in a north-south direction with the driver side rear door located away from a curb. The location and/or orientation information may be used by the pedestrian 140 to move towards the driver side rear door of the vehicle 115 or around the vehicle 115 to the curb so as to enter the vehicle 115 from the curb side.

Figure 5:
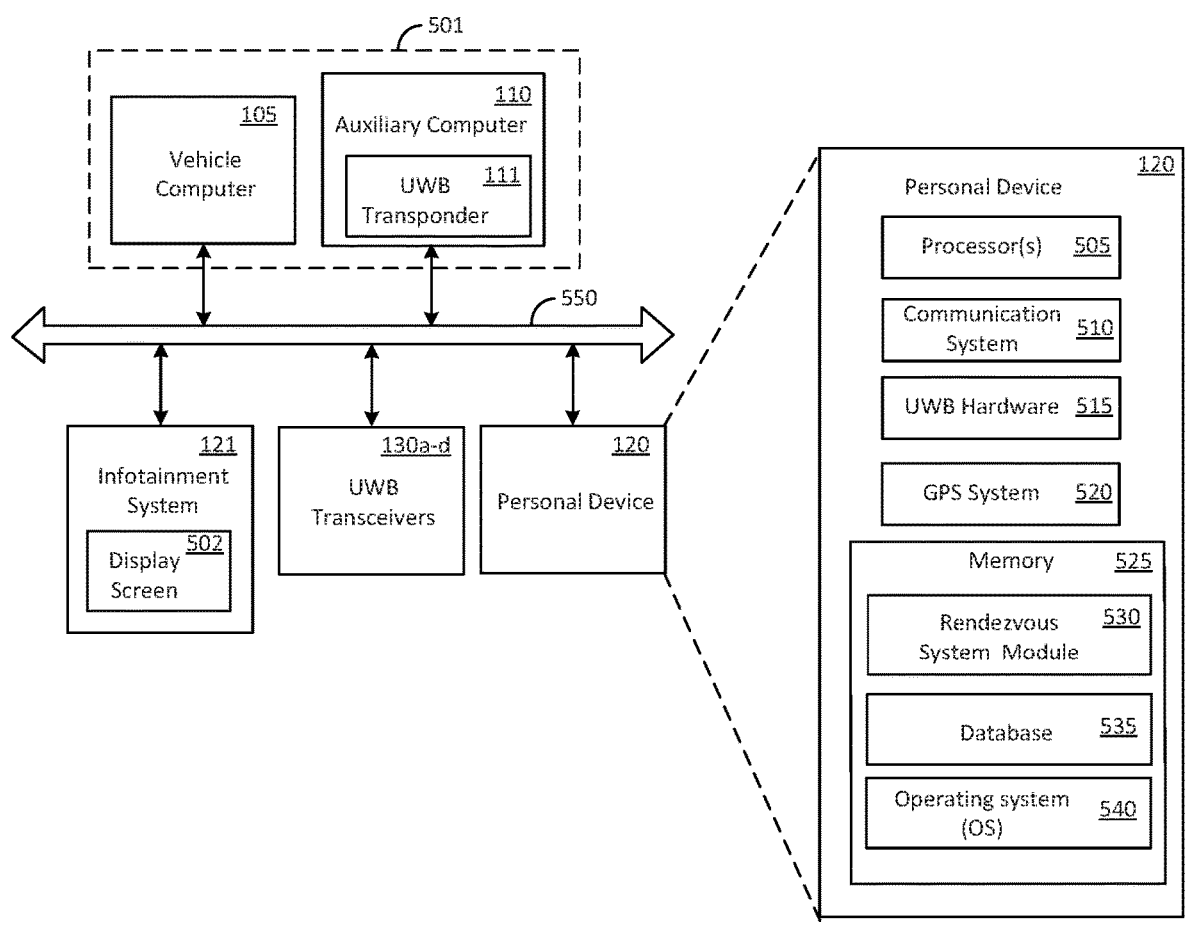
FIG. 5 illustrates some example components of a pedestrian-vehicle rendezvous system provided in a vehicle in accordance with an embodiment of the disclosure.

FIG. 5 illustrates some example components of the pedestrian-vehicle rendezvous system 100 provided in the vehicle 115 in accordance with an embodiment of the disclosure. The example components may include the vehicle computer 105, the auxiliary computer 110, the infotainment system 121, the UWB transceivers 130a through 130d, and the personal device 120 carried by the driver 125, The various components are communicatively coupled to each other via one or more buses, such as a bus 550 that can be implemented using various wired and/or wireless technologies. For example, the bus 550 can be a vehicle bus that uses a controller area network (CAN) bus protocol, a Media Oriented Systems Transport (MOST) bus protocol, and/or a CAN flexible data (CAN-FD) bus protocol. Some or all portions of the bus 550 may also be implemented using wireless technologies such as Bluetooth®, Ultra-Wideband, Wi-Fi, ZigBee®, or near-field-communications (NFC). For example, the bus 550 may include a Bluetooth® communication link that allows the personal device 120 to wirelessly communicate with the auxiliary computer 110 and/or the UWB transponder 111.

In one exemplary implementation, the auxiliary computer 110 is an independent standalone unit. In another exemplary implementation, some or all components of the auxiliary computer 110 may be incorporated into the vehicle computer 105 (as indicated by the dashed line box 501). The UWB transceivers 130a through 130d may be communicatively coupled to the UWB transponder 111 provided in the auxiliary computer 110 (either wirelessly or through the bus 550). The UWB transceivers 130a through 130d may also be configured to communicate over a UWB radio link with the personal device 145.

In one example implementation, the personal device 120 is coupled to the bus 550 by use of a USB cable. Tethering the personal device 120 to the bus 550 via a wired medium such as the USB cable provides a level of security that may be higher than obtainable through a wireless connection. In another example implementation, the personal device 120 is coupled to the bus 550 via a Bluetooth® link. The use of the Bluetooth® link provides some level of convenience when the personal device 120 is a smartphone.

The infotainment system 121 can include a display screen 502 that is used for displaying various items associated with pedestrian-vehicle rendezvous operations in accordance with the disclosure. For example, the display screen 502 may be used to display a map or an image indicating the location of the vehicle 115 and the personal device 145 and/or an orientation of the vehicle 115 with respect to the pedestrian 140.

The personal device 120 can include a processor 505, a communication system 510, UWB hardware 515, GPS system 520 and a memory 525. The communication system 510 can include various objects such as a Bluetooth® transceiver and a cellular communication system. The Bluetooth® transceiver can be used to communicatively couple the personal device 120 to various components such as, for example, the auxiliary computer 110 and the personal device 145 (when the pedestrian 140 is seated inside the vehicle 115). The cellular communication system can be used for cellular communications (voice, text, etc.) between the personal device 120 and the personal device 145. The communication system 510 can also be used for transmitting to the infotainment system 121 images for display on the display screen 502. The images may be related to pedestrian-vehicle rendezvous operations in accordance with the disclosure.

The UWB hardware 515 is selected to allow the personal device 120 to execute UWB communications with various elements such as the transceivers 130a through 130b, the auxiliary computer 110, and the personal device 145. The GPS system 520 is configured to process GPS signals from the GPS satellite 135 (shown in FIG. 1) and to provide location information of various objects such as the personal device 120 and the vehicle 115.

The memory 525, which is one example of a non-transitory computer-readable medium, may be used to store an operating system (OS) 540, a database 535, and various code modules such as a rendezvous system module 530. The code modules are provided in the form of computer-executable instructions that can be executed by the processor 505 for performing various operations in accordance with the disclosure. For example, the rendezvous system module 530 can be executed by the processor 505 for performing various operations in accordance with the disclosure. The operations are generally directed at facilitating a rendezvous between a vehicle and a pedestrian.

In an exemplary implementation, the rendezvous system module 530 is a software application that is downloaded into the personal device 120 and activated by the driver 125 when the vehicle 115 has to rendezvous with the pedestrian 140. The software application can be an independent application or can be configured to work in cooperation with another software application such as, for example, a software application provided by a ride-hail company such as Uber® of Lyft®. Thus, for example, the rendezvous system module 530 may cooperate with a software application provided by a ride-hail company in order to obtain information about the pedestrian 140 when the pedestrian 140 requests a ride in a ride-hail vehicle. The rendezvous system module 530 may also cooperate with a messaging application such as WhatsApp® to transmit text messages and images from the personal device 120 to the personal device 145 of the pedestrian 140.

The database 535 may be used to store various types of data that can be used by the rendezvous system module 530. For example, the database 535 may be used to store information about the pedestrian 140, preferences of the pedestrian 140 (seating preference, music preference, payment-related information, etc.).

Figure 6:
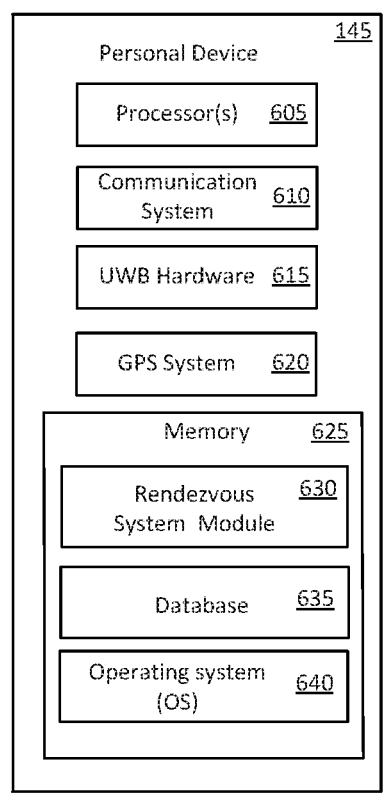
FIG. 6 illustrates some example components of a pedestrian-vehicle rendezvous system provided in a personal device in accordance with an embodiment of the disclosure.

FIG. 6 illustrates some example components of the pedestrian-vehicle rendezvous system 100 provided in the personal device 145 carried by the pedestrian 140, in accordance with an embodiment of the disclosure. The personal device 145 can include a processor 605, a communication system 610, UWB hardware 615, GPS system 620 and a memory 625. The communication system 610 can include various items such as a Bluetooth® transceiver and a cellular communication system. The Bluetooth® transceiver can be used to communicatively couple the personal device 145 to various components such as, for example, the personal device 145 (when the pedestrian 140 is seated inside the vehicle 115). The cellular communication system can be used for cellular communications (voice, text, etc.) between the personal device 145 and the personal device 120.

The UWB hardware 615 is selected to allow the personal device 145 to execute UWB communications with various elements such as the transceivers 130a through 130b and the personal device 145. The GPS system 620 is configured to process GPS signals from the GPS satellite 135 (shown in FIG. 1) and to provide location information of various objects such as the personal device 120 and the vehicle 115.

The memory 625, which is another example of a non-transitory computer-readable medium, may be used to store an operating system (OS) 640, a database 635, and various code modules such as a rendezvous system module 630. The code modules are provided in the form of computer-executable instructions that can be executed by the processor 605 for performing various operations in accordance with the disclosure. For example, the rendezvous system module 630 can be executed by the processor 605 for performing various operations in accordance with the disclosure. The operations are generally directed at facilitating a rendezvous between a vehicle and a pedestrian.

In an exemplary implementation, the rendezvous system module 630 is a software application that is downloaded into the personal device 145 and executed by the pedestrian 140 when the pedestrian 140 wishes to rendezvous with the vehicle 115. The software application can be an independent application or can be configured to work in cooperation with another software application such as, for example, a software application provided by a ride-hail company such as Uber® of Lyft®. Thus, for example, the rendezvous system module 630 may cooperate with a software application provided by a ride-hail company in order to obtain information about the vehicle 115 and/or the driver 125, when the pedestrian 140 requests a ride in a ride-hail vehicle. The rendezvous system module 530 may also cooperate with a messaging application such as WhatsApp® to allow the pedestrian 140 to communicate with the driver 125 (via the personal device 120 of the driver 125).

In an example operating scenario, the rendezvous system module 530 keeps track of a status of a pedestrian-vehicle rendezvous operation involving the use of GPS signals and UWB communications in accordance with the disclosure. The software application may determine that a tracking operation using GPS is being carried out at a first instant in time. The GPS signal strength is strong and the pedestrian 140 is able to track a movement of the vehicle 115 with a first degree of accuracy in accordance with GPS tracking technology. The software application may display a message, an image, or an icon on the smartphone to indicate that tracking of the vehicle 115 is stable and that the GPS signal is strong.

The driver 125 of the vehicle 115 may later call the pedestrian 140 to inform him/her that the vehicle 115 is about to enter an underground garage where GPS signal coverage may be weak or non-existent. The software application may modify the message, image, or icon to indicate that tracking of the vehicle 115 is becoming unstable and the GPS signal is weak or intermittent, when the pedestrian 140 subsequently walks into the underground garage.

The software application may then display a message to inquire whether the pedestrian 140 wishes to initiate UWB communications with the personal device 120 of the driver 125 (or the auxiliary computer 110) for purposes of tracking the vehicle 115 in the underground garage. The pedestrian 140 may provide an indication that he/she wishes to do so. Upon receiving this indication, the software application may initiate operations to establish a UWB radio link and identify a location of the vehicle 115 in the underground garage. In an alternative scenario, the software application may automatically initiate UWB communications without displaying a message of inquiry, when the personal device 145 is within a range of operation of the UWB transponder in the vehicle 115.

The database 635 may be used to store various types of data that can be used by the rendezvous system module 530. For example, the database 635 may be used to store information about the pedestrian 140, preferences of the pedestrian 140 (seating preference, music preference, payment-related information, etc.).

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and memory, as discussed herein. An implementation of the devices, systems, and methods disclosed herein may communicate over a computer network.

A "network" and a "bus" is defined as one or more data links that enable the transport of electronic data between computer systems and/or modules and/or other electronic devices. When information is transferred or provided over a network, a bus, or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced using various devices including personal computers, desktop computers, laptop computers, message processors, handheld devices, multi-processor systems, microprocessor-based or programmable consumer electronics, mobile telephones, PDAs, tablets, pagers, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

A memory such as the memory 525 and the memory 625 described herein, can include any one memory element or a combination of volatile memory elements (e.g., random access memory (RAM, such as DRAM, SRAM, SDRAM, etc.)) and non-volatile memory elements (e.g., ROM, hard drive, tape, CD ROM, etc.). Moreover, the memory device may incorporate electronic, magnetic, optical, and/or other types of storage media. In the context of this document, a "non-transitory computer-readable medium" can be, for example, but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

In the context of software, the operations described herein with respect to processors, such as the processor 505 and the processor 605, may be implemented by computer-executable instructions stored on one or more non-transitory computer-readable media such as the memory 525 and the memory 625 respectively, that, when executed by one or more processors such as the processor 505 and the processor 605, perform the recited operations. Generally, computer-executable instructions include routines, programs, objects, components, data structures, and the like that perform particular functions or implement particular abstract data types.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   determining, by a first personal device, a first location of a vehicle with a first level of accuracy;
   establishing, between the first personal device and a second personal device in the vehicle, an ultra-wideband (UWB) radio link; and
   determining, with the UWB radio link, a second location of the vehicle with a second level of accuracy that is greater than the first level of accuracy,
   wherein the vehicle is a ride-hail vehicle, wherein the first personal device is a first smartphone of a customer of the ride-hail vehicle, and wherein locating the ride-hail vehicle with the first level of accuracy is based on information provided by a global positioning system (GPS), and
   wherein communicating over the UWB radio link to locate the ride-hail vehicle with the second level of accuracy comprises the first personal device transmitting a signal to a UWB transceiver in the ride-hail vehicle.

2. The method of claim 1, wherein the first personal device is carried by the customer who is located outside the ride-hail vehicle and the second personal device is carried by a driver of the ride-hail vehicle, the method further comprising:
   locating, by the second personal device, the first personal device carried by the customer at a first spot outside the ride-hail vehicle with a third level of accuracy; and
   communicating over the UWB radio link to locate the first personal device with a fourth level of accuracy that is greater than the first level of accuracy when the customer is at a second spot outside the ride-hail vehicle, the second spot closer to the ride-hail vehicle than the first spot.

3. The method of claim 2, wherein the second personal device is a second smartphone, and wherein the third level of accuracy is substantially identical to the first level of accuracy and the fourth level of accuracy is substantially identical to the second level of accuracy.

4. The method of claim 1, wherein communicating over the UWB radio link to locate the ride-hail vehicle with the second level of accuracy comprises the first personal device executing a time-of-flight procedure that comprises transmitting the signal to the UWB transceiver in the ride-hail vehicle.

5. The method of claim 1, wherein communicating over the UWB radio link to locate the ride-hail vehicle with the second level of accuracy comprises executing a triangulation procedure, the triangulation procedure comprising the first personal device transmitting a signal to a first UWB transceiver and to a second UWB transceiver in the ride-hail vehicle.

6. A method comprising:
   detecting, by a first personal device inside a vehicle, a second personal device that is outside the vehicle and within a range of operation of an ultra-wideband (UWB) transponder in the vehicle;
   establishing a UWB radio link between the first personal device and the second personal device;
   determining, with the UWB radio link, a location of the second personal device outside the vehicle, wherein the vehicle is a ride-hail vehicle, wherein the first personal device is a first smartphone of a driver of the ride-hail vehicle, and wherein the second personal device is a second smartphone of a customer of the ride-hail vehicle;
   locating, with a third level of accuracy, the first smartphone of the driver by the second smartphone of the customer via a cellular phone service when the customer is at a first distance from the ride-hail vehicle; and
   locating, with a fourth level of accuracy, the first smartphone of the driver by the second smartphone of the customer via a signal transmitted over the UWB radio link when the customer is at a second distance from the ride-hail vehicle, the second distance being shorter than the first distance.

7. The method of claim 6, wherein communicating over the UWB radio link to identify the location of the second smartphone comprises the first smartphone transmitting a signal to the second smartphone through the UWB transponder in the ride-hail vehicle.

8. The method of claim 6, wherein locating the first smartphone of the driver with the fourth level of accuracy comprises the second smartphone transmitting the signal to the UWB transponder in the ride-hail vehicle, the UWB transponder communicatively coupled to the first smartphone of the driver.

9. The method of claim 6, wherein locating the first smartphone of the driver with the fourth level of accuracy comprises the second smartphone executing a time-of-flight procedure that comprises transmitting the signal to the UWB transponder in the ride-hail vehicle.

10. The method of claim 6, wherein locating the first smartphone of the driver with the fourth level of accuracy comprises executing a triangulation procedure, the triangulation procedure comprising the second smartphone transmitting the signal to a first UWB transceiver and to a second UWB transceiver in the ride-hail vehicle.

11. A personal device comprising:
    a memory that stores computer-executable instructions; and
    a processor configured to access the memory and execute the computer-executable instructions to at least:
       locate a vehicle with a first level of accuracy, wherein the vehicle is a ride-hail vehicle, and wherein the personal device is a smartphone of a customer of the ride-hail vehicle;
       establish an ultra-wideband (UWB) radio link between the personal device and a UWB transponder associated with the vehicle;
       communicate over the UWB radio link to locate the vehicle with a second level of accuracy that is greater than the first level of accuracy; and
       execute a triangulation procedure to locate the vehicle, the triangulation procedure comprising transmitting a signal from the communication system to a first UWB transceiver and a second UWB transceiver in the vehicle; and
    a communication system operable to communicate over the UWB radio link with the UWB transponder in the vehicle.

12. The personal device of claim 11, wherein the computer-executable instructions are loadable into the smartphone as a software application.

13. The personal device of claim 11, wherein the processor is further configured to access the memory and execute additional computer-executable instructions to at least:

execute a time-of-flight procedure to locate the ride-hail vehicle, the time-of-flight procedure comprising transmitting a signal from the communication system to a UWB transceiver in the ride-hail vehicle.

\* \* \* \* \*